Dec. 2, 1958  W. KADEN ET AL  2,862,678
FILM SPOOL FOR CAMERAS
Filed Sept. 27, 1954
*Fig.1*
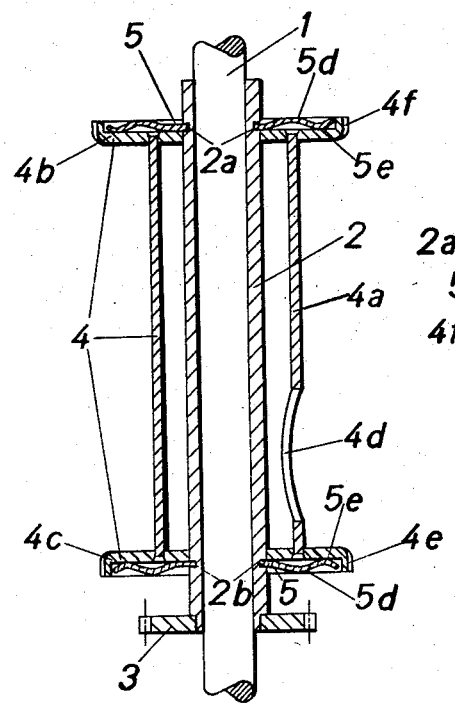
*Fig.2*
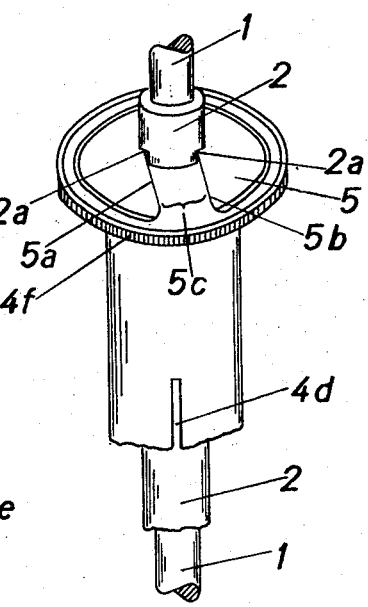
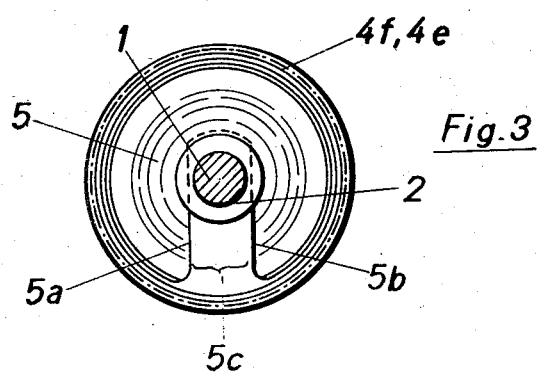
*Fig.3*
INVENTORS:
WILLY KADEN
FERDINAND STIEFENHOFER
BY *Connolly & Hutz*
THEIR ATTORNEYS United States Patent Office 2,862,678
Patented Dec. 2, 1958

2,862,678
FILM SPOOL FOR CAMERAS

Willy Kaden and Ferdinand Stiefenhofer, Munich, Germany, assignors to AGFA Aktiengesellschaft, Leverkusen, Germany, a corporation of Germany Application September 27, 1954, Serial No. 458,617
Claims priority, application Germany October 2, 1953

4 Claims. (Cl. 242—71.8)

The present invention relates to a double-acting friction element which is particularly suitable for use with film take-up spools incorporated in photographic cameras.

Owing to the restricted space available it has been difficult hitherto to fit the components of such a take-up spool quickly and in such a manner as to ensure perfect functioning or, in the case of a repair, to enable the unit to be dismantled with a minimum of manipulation.

To overcome these disadvantages, the present invention provides a friction element so shaped as to engage a rotatable sleeve, and by friction, a flange of a film spool and being adapted in conjunction with a similar element, to fix the film spool in an axial direction on the sleeve, said element being provided with at least one corrugation for increasing its frictional engagement with the film spool flange.

Advantageously, the friction element is of circular or disc shape and the contour of the disc is interrupted by a radial gap, slot or the like for engagement with the sleeve.

To prevent deformation during assembly, according to the present invention, corrugations arranged concentrically about the center of the element may be formed by a process producing no chips of the material of the element to ensure the stability of their shape. The stability of the shape of the friction element is further enhanced by making it from an elastic non-ferrous metal suitable for cold forming as for example, aluminum.

The advantage of the device described above lies not only in its extremely simple, suitable form making it inexpensive to produce but also in the fact that it is absolutely reliable in operation and easy to adjust. The flat and compact form of the friction element makes it readily accessible in the camera and facilitates any necessary replacement of the take-up spool for repair purposes, or the like.

The invention is illustrated in the accompanying drawing in which:

Fig. 1 is a vertical section through a film take-up spool,

Fig. 2 is a perspective view of the same take-up spool with its lower half broken away, and Fig. 3 is a plan view of Fig. 1.

Referring to the drawing, a spindle 1 is supported in a camera housing (not shown in the drawing). The spindle 1 carries with sufficient play a rotatable sleeve 2 at the bottom of which there is attached in known manner a gear 3. The gear is adapted to be connected with a film-perforation engaging roller by means of further gears (likewise not shown in the drawing). A film take-up spool 4 is concentrically mounted over the sleeve 2, and consists of a cylindrical sleeve 4a having integral end flanges 4b and 4c. In accordance with the known practice the cylindrical sleeve 4a is provided with a slot 4d for attaching the unexposed film strip.

To facilitate the manipulation of the take-up spool 4, its flanges 4b, 4c are provided with teeth or milled, knurled or otherwise serrated edges 4e, 4f.

Two pairs of parallel slots 2a, 2b are provided in the sleeve 2 at the radial levels of the turned up edges 4e, 4f of the flanges 4b, 4c. These slots engage the edges 5a, 5b of radially directed gap 5c in a pair of disc shaped friction elements 5 positioned against the outer faces of the respective end flanges 4b and 4c. The discs 5 enable the take-up spool 4 to be fixed on the sleeve 2 in an axial direction.

The provision of concentric corrugations 5d, 5e on the friction elements 5 ensures that the take-up spool 4 takes part in the turning movement of the sleeve 2.

As many apparently widely different embodiments of this invention may be made without departing from the spirit and scope hereof, it is to be understood that the invention is not limited to the specific embodiments hereof, except as defined in the appended claims.

What we claim is:

1. A film take-up device for a photographic camera comprising a cylindrical shaft rotatably mounted upon a stationary portion of said housing, two pairs of slots cut into opposite sides of said shaft with each of said pairs being disposed in a common plane perpendicular to the axis of said shaft, the roots of each said opposite pairs of slots being straight and disposed parallel to each other, a spool including a hollow cylinder having an inside diameter greater than the outside diameter of said shaft and including a pair of flanges having outwardly dished edges, a pair of disc-shaped spring elements, each of said spring elements including a radially disposed slot whose sides are disposed parallel to the roots of said slots for insertion therein, a film attaching means operatively associated with said hollow cylinder for attaching the end of a strip of film thereto, said two pairs of slots being longitudinally separated an overall distance sufficiently greater than the distance between the outside surfaces of the central portions of each of said flanges to permit insertion of said spring elements within said slots after said shaft has been inserted within said spool to longitudinally position said spool and frictionally restrain its rotational movement relative to said shaft, a gear secured to an end of said shaft extending out of said spool for transmitting film-winding motion to said shaft, and the outer edges of said spring elements being disposed in resilient contact within said outwardly dished edges of said flanges to maintain said spring elements in firm engagement with said shaft when said spool rotates relative to said shaft whereby the sides of said spring elements are maintained in steady resilient frictional contact with said flanges to permit said shaft to drive said spool for winding film upon said spool and to permit said spool to slip relative to said shaft after a predetermined amount of film is wound upon said spool.

2. A device as set forth in claim 1 wherein said shaft is comprised of a hollow sleeve, a spindle is mounted upon a stationary portion of said housing, and said sleeve is rotatably mounted upon said spindle.

3. A device as set forth in claim 1 wherein said spring elements are corrugated to increase the strength of their frictional engagement with said flanges.

4. A device as set forth in claim 1 wherein said inside diameter of said hollow cylinder is considerably larger than said outside diameter of said shaft to provide an annular space therebetween, and a longitudinal slot is provided in the side of said hollow cylinder for inserting the end of a film strip therein for attaching said end of a strip of film to said spool.

References Cited in the file of this patent

UNITED STATES PATENTS

| | | |
|---|---|---|
| 686,664 | Mansfield | Nov. 12, 1901 |
| 688,652 | Krug | Dec. 10, 1901 |
| 2,233,389 | Kende et al. | Feb. 25, 1941 |
| 2,425,827 | Rancourt | Aug. 19, 1947 |